US010599230B1

(12) United States Patent
Chan

(10) Patent No.: US 10,599,230 B1
(45) Date of Patent: Mar. 24, 2020

(54) METHOD FOR DYNAMICALLY ADJUSTING A BACKLIT KEYBOARD ILLUMINATION MODE

(71) Applicant: KYE SYSTEMS CORP., New Taipei (TW)

(72) Inventor: Chi-Wai Chan, New Taipei (TW)

(73) Assignee: KYE SYSTEMS CORP., New Taipei (TW)

( * ) Notice: Subject to any disclaimer, the term of this patent is extended or adjusted under 35 U.S.C. 154(b) by 0 days.

(21) Appl. No.: 16/169,862

(22) Filed: Oct. 24, 2018

(51) Int. Cl.
G06F 3/02 (2006.01)
G06F 3/023 (2006.01)
H05B 37/02 (2006.01)
H01H 13/7065 (2006.01)

(52) U.S. Cl.
CPC .......... *G06F 3/0202* (2013.01); *G06F 3/0237* (2013.01); *G06F 3/0238* (2013.01); *H01H 13/7065* (2013.01); *H05B 37/02* (2013.01)

(58) Field of Classification Search
CPC ......... G06F 3/016; G06F 3/0202; H01H 3/85; H01H 2201/036; H01H 2215/05
See application file for complete search history.

(56) References Cited

U.S. PATENT DOCUMENTS

2011/0102326 A1* 5/2011 Casparian .............. G06F 3/016
345/168

* cited by examiner

Primary Examiner — Shaheda A Abdin
(74) Attorney, Agent, or Firm — Maschoff Brennan

(57) ABSTRACT

A method for dynamically adjusting a backlit mode of a backlit keyboard, which is suitable for a host computer that is electrically connected to a keyboard, wherein the keyboard has a backlit module, and the method includes: obtaining a mode signal, and loading the common mode when the mode signal is indicated as a common mode configuring a file, or when the mode signal indicates a custom mode, detecting an application currently running by the host, wherein the application is in a foreground window, obtaining a custom profile corresponding to the application, and the backlit module is controlled to emit a light according to the common configuration file or the custom configuration file optionally.

2 Claims, 2 Drawing Sheets

METHOD FOR DYNAMICALLY ADJUSTING A BACKLIT KEYBOARD ILLUMINATION MODE

BACKGROUND

Technical Field

The present disclosure is related to a method for adjusting the illumination of a keyboard backlit module, in particular to a method for selectively adjusting the illumination mode of a keyboard backlit module according to a foreground application.

Related Art

With the evolution of the manufacturing process, the Light-Emitting Diodes (LEDs) today have been able to emit light of various colors, and are widely used in various fields, including a backlit keyboard. The backlit keyboard is mainly embodied in the keyboard keys or the panel lighting, which allows the user to see the symbols on the keys clearly without turning on the lights at night. Driven by the game market, in order to meet the high demands of players for visual presentation, backlit keyboards that emit multiple colors of light are widely favored by users.

In practice, a software engineer writes a program in a combination language to control the lighting effects of the backlit module of the keyboard. Before the backlit keyboard is shipped from the factory, the lighting profile for controlling the backlit module is pre-burned in the memory of the product. However, due to the cost of the product, it is often impossible to use a memory with a capacity large enough to store a variety of light patterns in a backlit keyboard. In general, up to five to ten sets of light flashing modes are available for the user to choose from. With the increasing popularity of customized products, the limited and streamlined lighting patterns are no longer sufficient for consumers to meet their unique and individual needs. Therefore, instead of increasing the illumination option of the backlit keyboard without limitation, it is better to provide a mechanism for the user to define the illumination profile. On the one hand, it can meet the needs of consumers to pursue personalized products, on the other hand, it also reduces the cost of the products themselves. However, as the number of applications that users perform at the same time increases, such as document software, drawing software, web browsers, games, etc., each time the user needs to reset the lighting profile when switching applications, or re-open the interface for loading the lighting profile, which undoubtedly brings a lot of inconvenience and trouble to the user.

SUMMARY

In view of this, the present invention provides a method for dynamically adjusting the illumination mode of a backlit keyboard, providing a user-defined keyboard backlit, thereby solving the various inconveniences mentioned above.

A method for dynamically adjusting a backlit mode of a backlit keyboard according to an embodiment of the present disclosure is applicable to a host for electrically connecting a keyboard, wherein the keyboard has a backlit module, and the method includes: obtaining a mode signal; when the mode signal indicates it is in the common mode, the common configuration file is loaded; or when the mode signal indicates it is in the custom mode, the application currently running by the host is detected, wherein the application is in the foreground window; and the corresponding program is obtained; and selectively according to the universal profile or the custom profile to control the backlit module to emit light.

A method for dynamically adjusting a backlit mode of a backlit keyboard according to an embodiment of the disclosure, wherein before obtaining the mode signal, the method further includes: obtaining a hardware identification code of the keyboard, the hardware identification code including a product identification code and a vendor identification code; and confirming whether the hardware identification code exists in the identification code list; and obtaining the mode signal further includes: when the hardware identification code exists in the identification code list, obtaining the mode signal. After confirming that the hardware identification code exists in the identification code list, the method further includes: confirming the configuration file list corresponding to the hardware identification code; and confirming whether the configuration file list has a custom configuration file corresponding to the application; wherein, when the configuration file list has a custom configuration file corresponding to the application, the backlit module controls the light emitting by using the custom configuration file; otherwise, one of the configuration files in the configuration file list is used as the custom configuration file.

With the above architecture, the method for dynamically adjusting the backlit mode of the backlit keyboard disclosed by the present disclosure achieves the following functions by an embedded program running in the background of the operating system: in addition to providing common application for all applications, the illumination profile allows the user to customize the illumination mode corresponding to the backlit module on the keyboard according to different applications and save it as a custom illumination profile. Therefore, the effect of individually controlling the backlit module on the keyboard can be achieved. The illumination profile includes setting items such as LED brightness, LED mode, backlit effect, and backlit speed. The user only needs to go through the one-time setting, and then the embedded mode selects the common mode or the custom mode. In the common mode, the backlit module on the keyboard will illuminate according to the settings in the common profile. In custom mode, the embedded program has a mechanism to automatically detect the application and switch the illumination profile. Users can switch applications as they like, and the backlit module of the keyboard can also instantly adjust the illumination mode with the application to expand the user's visual experience.

The above description of the disclosure and the following description of the embodiments of the present disclosure are intended to illustrate and explain the spirit and principles of the invention, and can give a further explain of the present disclosure.

BRIEF DESCRIPTION OF THE DRAWINGS

The present disclosure will become more fully understood from the detailed description given here in below and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

A method for dynamically adjusting a backlit mode of a backlit keyboard according to an embodiment of the present disclosure is implemented by an embedded program running on a host computer, and a computer host connected to a designated backlit keyboard.

The embedded program is, for example, a driver that is built into the computer; or is mounted by a CD; or is installed by USB OTG (on-the-go) through the keyboard; or downloaded from the original website by the user; or an application software installed after downloading in the form of APP (Application).

The backlit keyboard is a keyboard with a backlit module. The backlit module includes a plurality of light emitting units and a control unit. The light emitting unit is, for example, a Light-Emitting Diode (LED) or a Micro LED (Micro LED); since the hardware design of the backlit module is a well-known technology, the present disclosure is not limited thereto; Further, the present disclosure is not limited to the type of hardware of the light-emitting unit, the number, or the form in which the light-emitting unit is disposed on the keyboard. The control unit reads an illumination profile from the host or from its own memory to control the plurality of lighting units to respectively emit colored lights of a specified color in accordance with the specified mode. The illumination profile includes one or more instructions or a code segment, each command or code segment for controlling all or a portion of the lighting unit.

Figure 1:
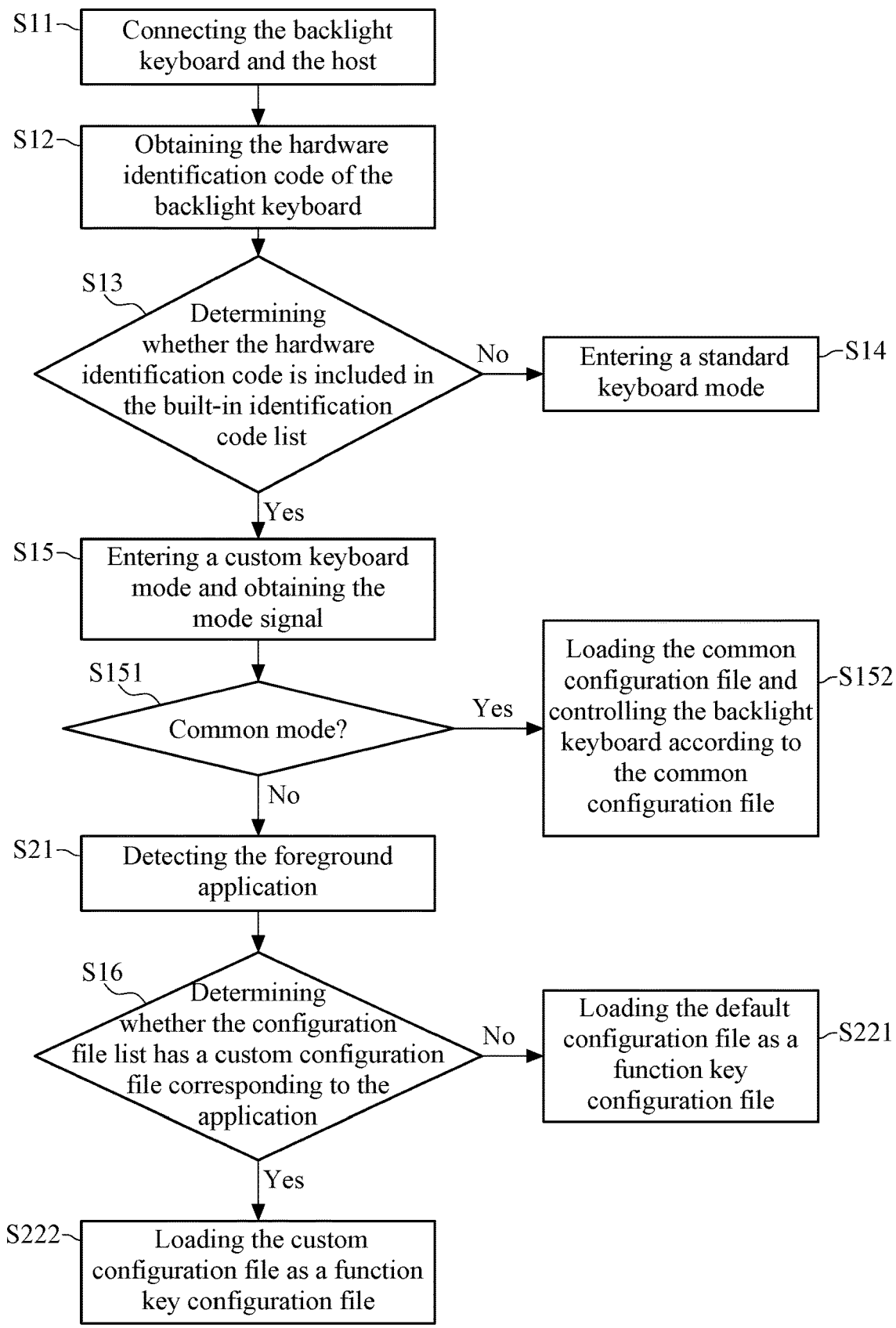
FIG. 1 is a flow chart of detecting keyboard according to an embodiment of the disclosure.

Please refer to FIG. 1, which is a flow chart of detecting a backlit keyboard according to an embodiment of the disclosure. First, please refer to step S11 to connect the backlit keyboard and the host. In practice, after the computer is turned on, the user needs to electrically connect the backlit keyboard to the computer wirelessly or by wire. The embedded program can be started in principle when the writing system is loaded, or can be started when the user selects it. When the embedded program is executed, the user can also change it to not to start (do not execute) at any time, or further uninstall the embedded program.

Please refer to step S12, obtaining the hardware identification code of the backlit keyboard. In detail, after the backlit keyboard is connected to the host, the embedded program already running in the operating system automatically detects the hardware identification code of the backlit keyboard. The hardware identification code includes a product ID (PID) and a vendor ID (VID).

Referring to step S13, the embedded program determines whether the hardware identification code is included in the built-in identification code list. In other words, the embedded program confirms whether or not the currently connected backlit keyboard model is supported. In practice, in addition to automatically checking the list of identifiers stored by the embedded program, the user can also select the keyboard model that is electrically connected to the host in the list. Later, when the user purchases an additional new backlit keyboard and connects to the host, the new backlit keyboard can be supported by updating the embedded program.

Please refer to step S14 and step S15 together. If it is confirmed in step S13 that the hardware identification code of the keyboard connected to the host is not present in the identification code list built in the embedded program, for example, the actually connected keyboard is not a backlit keyboard but a common keyboard. In this case, as shown in step S14, a standard keyboard mode is entered, that is, the embedded program loads a configuration file of a commercially available standard keyboard, and the configuration file does not include an instruction or a code for controlling the lighting unit. Conversely, if it is determined in step S13 that the identification code list has the hardware identification code of the backlit keyboard connected to the host, the backlit keyboard supports the subsequent operation of the embedded program, so as shown in step S15, the embedded program enters the custom keyboard mode and begins to detect whether the user is sending a mode signal.

Referring to step S151, it is determined whether the mode signal acquired in step S15 is indicated as being in the common mode. The mode signal is generated by a user selecting a status window displayed on the screen, or a user pressing a special button on the backlit keyboard or a predetermined combination of a single button or a plurality of buttons. In this mode signal, the present disclosure does not limit the manner in which the mode signal is triggered. The embedded program sends a corresponding mode signal based on the mode selected by the user. In particular, the mode signal can be used to indicate two modes: common mode and custom mode. When the mode signal is indicated as the common mode, as shown in step S152, the embedded program loads the common configuration file and controls the backlit module to emit light according to the common configuration file. Basically, this common configuration file is suitable for the illumination profile of all applications executable in the host, which stores the illumination mode preset by the backlit keyboard manufacturer before leaving the factory, for example, when the button is pressed, the flash light is executed, and when the button is not pressed, adjust the brightness of the backlit keyboard with the breathing light. On the other hand, when the mode signal is specified as the custom mode, the embedded program will load the custom configuration file corresponding to the application according to the application executed by the current host, as described below.

Please refer to step S21, detecting the foreground application. In detail, the foreground application is an application that is being operated by a user in an operating system running after the computer is powered on, and the application is in a foreground window due to user operations. Generally, the operating system (OS) are usually Microsoft's Windows or Apple's Mac OS; however, the type of operating system is not limited to the above. It is additionally noted that after the process of step S13 to step S15 is completed, that is, the embedded program confirms that the list of identification codes of the backlit keyboard currently connected to the host has a hardware identification code, the mode signal is obtained, and when the custom mode is assigned, the detection of the foreground application can be started. This means that the embedded program will perform foreground application detection and its subsequent steps only if the specified backlit keyboard supported by the embedded program is connected to the host and the user do not select the common mode, and choose to operate the backlit keyboard by the custom illumination configuration file.

Referring to step S16, it is determined whether the configuration file list has a custom configuration file corresponding to the application detected in step S21. Specifically, in the flow of steps S13 to S15, the embedded program has confirmed that the hardware identification code of the keyboard exists in the identification code list. Next, in step S21, the embedded program confirms the foreground application. Then in step S16, the embedded program searches in the list of configuration files corresponding to the hardware identification code according to the detected application. In practice, a plurality of configuration file lists can be stored in the embedded program, and different configuration file lists correspond to keyboards of different models. At least one configuration file is included in each profile list, one of which is a default configuration file of the original factory, and the rest is a custom configuration file. The custom profile is, for example, a illumination configuration file set by the user through the embedded program. The default configuration file is, for example, a pre-configured (or pre-updated) illumination configuration file in the embedded program, or a illumination configuration file downloaded by the user from the original website in the future. It must be emphasized that each custom profile corresponds to an application that can run on the same computer host, and the default profile can also correspond to an application as a custom profile, or is common to all applications. The application includes a communication software such as Skype, Word, Excel, etc., or a multimedia playback software such as a Potplayer, etc., but the present disclosure does not limit the type of the application.

Please refer to step S221 and step S222 together. If the embedded program confirms that there is only one preset configuration file in the configuration file list without any custom configuration file in step S16, the embedded program loads the default configuration file as a function key configuration file as described in step S221. Otherwise, as described in step S222, the embedded program loads the custom profile to control the backlit module of the keyboard.

The above-mentioned general configuration file, default configuration file or custom configuration file, any of which includes a controllable illumination setting option of each illumination unit in the backlit module. For example, the user can set the speed of the flashing frequency of the light-emitting unit, the length of the flashing period, or set the light-emitting direction of the light-emitting array composed of a plurality of light-emitting units (for example, from top to bottom, left to right . . . and so on), common lighting modes (such as marquees, spectrum lights, colorful lights, xenon lights, etc.) or special lighting effects (such as wave lights, breathing lights, heartbeat lights). In practice, the embedded program can provide a graphical interface, such as the status window described above, for the user to click on the desired setting values for each of the illumination mode details, and the embedded program converts these settings to the control lighting unit. The instruction or code fragment and store the above conversion result as a custom configuration file.

Figure 2:
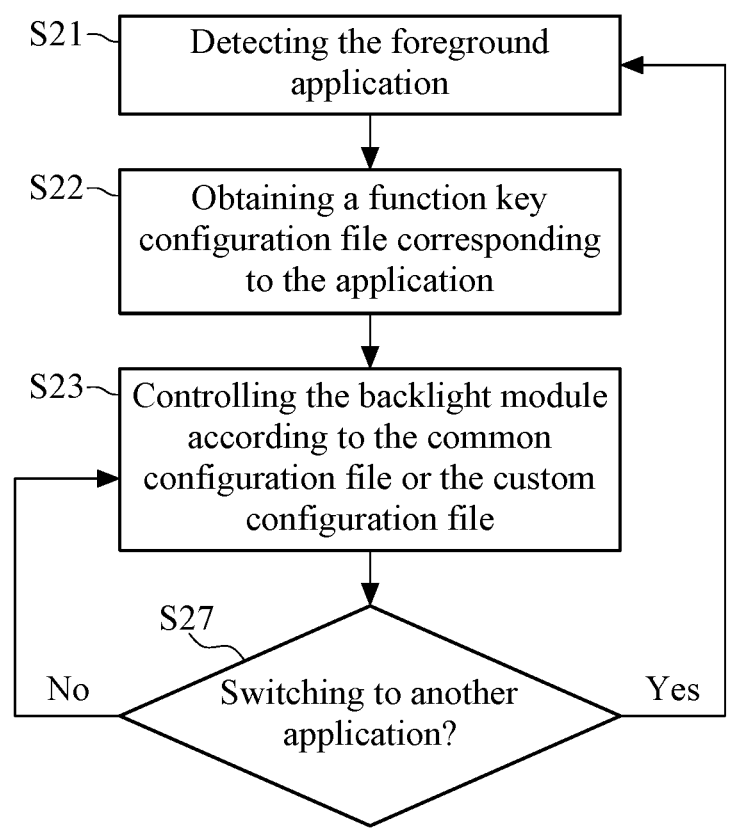
FIG. 2 is a flow chart of adjusting the illumination mode dynamically according to an embodiment of the disclosure.

Please refer to FIG. 2, which is a flow chart of dynamically adjusting the illumination mode of a backlit keyboard according to an embodiment of the disclosure. Please refer to step S21 to detect the foreground application. This step is an equivalent to step S21 of FIG. 1 and will not be described again here.

Please refer to step S22, obtaining a function key configuration file corresponding to the application. This step corresponds to steps S221 and S222 of FIG. 1. In short, the function key configuration file is a default configuration file or a custom configuration file. When the configuration file list has a custom configuration file corresponding to the foreground application, the embedded program uses the custom configuration file as the function key configuration file; otherwise, the default configuration file is used as the function key configuration file.

Please refer to step S23, controlling the backlit module to emit light according to the custom profile or the default profile. In detail, if the foreground window has not been switched by the user, and when the user selects the custom mode in step S151, then in step S23, the embedded program is based on the custom profile loaded in step S22 (default configuration file or custom configuration file) to control the backlit module of the keyboard to emit light.

Please refer to step S27, determining whether the detected application is switched to another application. In detail, after the step S26 is completed, the embedded program checks whether the foreground window at this time has been switched by the user. If yes, return to step S21 to re-detect the application currently in the foreground window, and then perform the method of dynamically adjusting the illumination mode of a backlit keyboard according to the foregoing steps S21 to S23 according to an embodiment of the present disclosure. Conversely, if the user does not switch the currently operating application, the process returns to step S23, the embedded program continues to control the illumination unit of the backlit module to perform a pre-specified illumination mode according to the currently loaded illumination profile. In addition, it should be noted that the present disclosure also retains the way in which the user switches between the common mode and the custom mode. Specifically, after the execution of step S27, if the determination result is "NO", the process returns to step S151 to determine again whether the user has changed from the custom mode to the common mode. Then, the flow of the foregoing steps S21 to S23 is continued.

Through the method of dynamically adjusting the illumination mode of a backlit keyboard introduced in steps S21~S27, the user saves the time for re-loading the illuminating profile when switching different applications, and also increases the flexibility of the user to switch between the common mode and the custom mode.

In summary, the method for dynamically adjusting the backlit mode of the backlit keyboard of the present disclosure can detect the backlit keyboard currently connected to the host through the embedded program. When it is confirmed that the model of the backlit keyboard can be supported, and when the user selects the custom mode, according to the foreground application that the current user is operating, the corresponding backlit keyboard model and the customization of the application are loaded. The illumination profile is configured to facilitate immediate control of the backlit module to operate in a custom illumination mode. The present disclosure is able to automatically switch to the illumination profile corresponding to the application according to different applications, so the user does not need to be limited to the few illumination modes on the original backlit keyboard, and can set his own preference of detailed setting items in the illumination profile for each application. In addition to the above-described custom mode, the present disclosure also provides a common mode and corresponding common configuration file suitable for all applications. In general, the method for dynamically adjusting the backlit mode of the backlit keyboard described in the present disclosure can be implemented on the hardware according to different keyboard models, and the backlit module of the backlit keyboard can be immediately followed according to the application. The setting of the illumination profile operates the various lighting units to provide a more diverse lighting visual effect, thereby giving the user a smoother operating experience.

What is claimed is:

1. A method for dynamically adjusting a backlit mode of a backlit keyboard suitable for a host electrically connected to a keyboard, wherein the keyboard has a backlit module, and the method comprises:

obtaining a hardware identification code of the keyboard;

confirming whether the hardware identification code exists in an identification code list;

obtaining a mode signal when the hardware identification code exists in the identification code list;

loading a common configuration file when the mode signal indicates a common mode; or detecting an application currently running on the host when the mode signal indicates a custom mode, and getting a custom configuration file corresponding to the application, wherein the application is in a foreground window;

confirming a configuration file list corresponding to the hardware identification code;

confirming whether the configuration file list has the custom configuration file corresponding to the application; wherein, when the custom configuration file corresponding to the application is in the configuration file list, controlling the backlit module to emit a light based on the custom configuration file; when the custom configuration file corresponding to the application is not in the configuration file list, controlling the backlit module to emit the light based on a default configuration file in the configuration file list; and controlling the backlit module to emit the light selectively according to the common configuration file or the custom configuration file.

2. The method for dynamically adjusting a backlit keyboard illumination mode according to claim 1, wherein the hardware identification code comprises a product identification code and a vendor identification code.

* * * * *